(No Model.)
R. B. YERBY.
METHOD OF AND APPARATUS FOR FORMING BOTTLE NECKS.
No. 550,312. Patented Nov. 26, 1895.
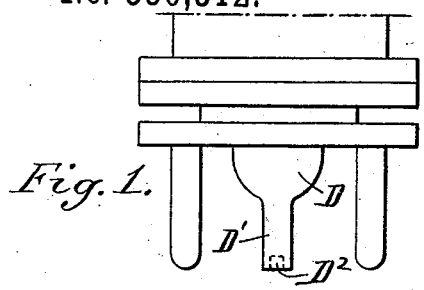
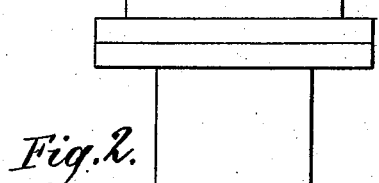
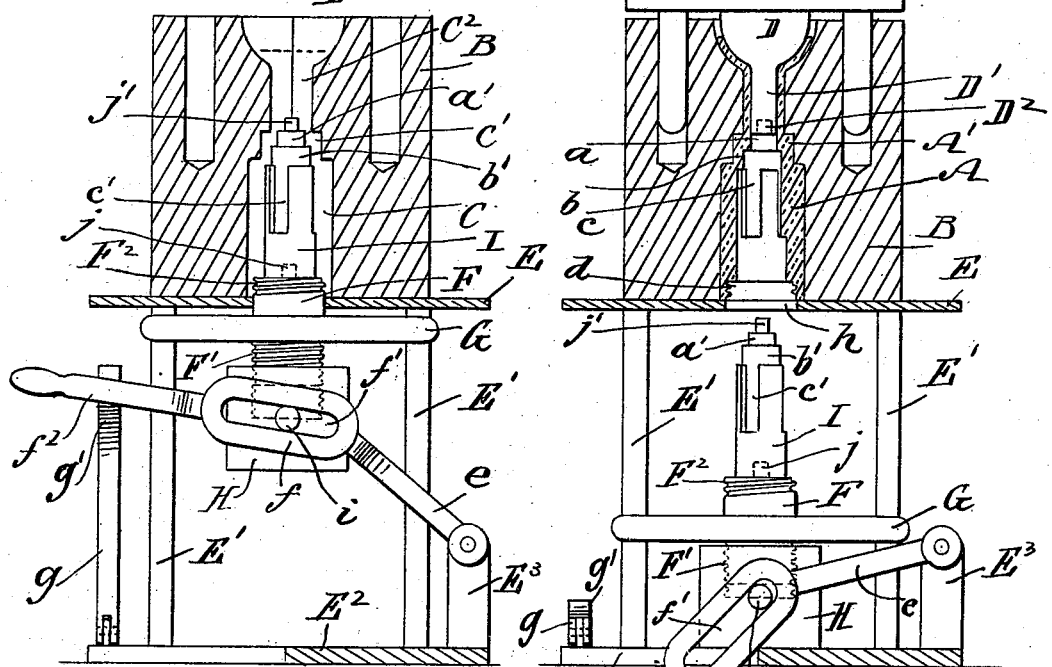
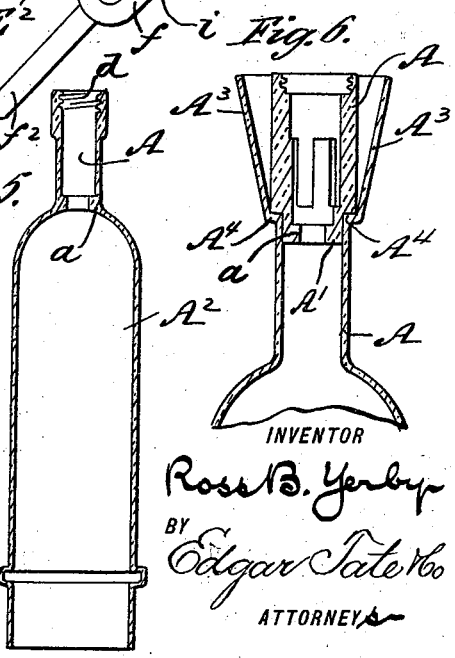
WITNESSES:
INVENTOR
Ross B. Yerby
BY Edgar Tate &Co
ATTORNEYS

UNITED STATES PATENT OFFICE.

ROSS B. YERBY, OF BROOKLYN, NEW YORK.

METHOD OF AND APPARATUS FOR FORMING BOTTLE-NECKS.

SPECIFICATION forming part of Letters Patent No. 550,312, dated November 26, 1895.

Application filed January 2, 1895. Serial No. 533,516. (No model.)

*To all whom it may concern:*

Be it known that I, ROSS B. YERBY, a citizen of the United States, and a resident of Brooklyn, county of Kings, and State of New York, have invented certain new and useful Improvements in Methods of and Apparatus for Forming Bottle-Necks, of which the following is a specification, reference being had to the accompanying drawings, forming a part thereof, in which similar letters of reference indicate corresponding parts in all the figures.

This invention relates to molds for forming bottles and auxiliary necks therefor, particularly such as are provided with interiorly-screw-threaded mouths, and also to a novel method of forming a bottle the neck of which is provided with interior shoulders or other projections or devices which cannot at present be formed in a glass bottle by any known means.

The object of the invention is to provide such a mold, apparatus, and method as will attain the desired results; and the invention consists in the method and mechanism hereinafter fully described.

Referring to the drawings, Figure 1 is a front sectional elevation of an apparatus embodying my invention, the mold being in section and the whole device ready for the entrance of the glass. Fig. 2 is a similar view with the molded bottle-neck therein and the interior plunger or core depressed. Fig. 3 is a longitudinal central section of the molded neck about to be applied to a bottle. Fig. 4 is a similar view of said neck and bottle clasped together and of the tool used for such purpose. Fig. 5 is a similar section of a whole bottle with a screw-threaded mouth formed by the apparatus. Fig. 6 is a like view to Fig. 3 of a slightly-modified arrangement of bottle and method of securing the neck.

My invention is primarily designed for the purpose of manufacturing bottles in which mechanism to prevent the refilling of such bottle is inserted, and this form of vessel has below the mouth thereof an inwardly-projecting annular shoulder or valve-seat $a$, having an annular ridge $b$ above the same, surmounted by vertical ribs $c$, upon and between which, respectively, slides a cylindrical valve, and the mouth of such bottle requires to be internally tapped to form a threaded recess $d$, in which an apertured disk stopper is screwed and cemented.

In the practice of my invention I first mold an auxiliary neck A, comprising the features mentioned—that is to say, the shoulder $a$, ridge $b$, ribs $c$, and threaded recess $d$—and this I effect by constructing a sectional metallic mold B of any suitable form, arranged to form a main recess C of a width corresponding to that of the auxiliary neck A, which recess is decreased in diameter near the top to form a small recess C', conforming to the width of a depending flange A', which I form upon the bottle of the auxiliary neck A. Above this point the recess is cylindrical and further reduced at $C^2$ and at the extreme top outwardly flared, as shown, to receive therein a bulb-shaped plunger D, having a shank or cylindrical projection D', in the under surface of which is formed an aperture $D^2$.

The mold B is mounted upon a table E, supported upon standards or uprights E', beneath which table at the rear is mounted upon a base $E^2$ a bearing $E^3$, having pivoted thereto an arm $e$, to the free end of which is secured a link $f$, having a longitudinal slot $f'$ therein, and upon the opposite side thereof a handle $f^2$, which rests upon a shoulder $g'$, projecting inwardly from a standard $g$ at the front of the device to support the link $f$ in the elevated position, as shown in Fig. 1.

The table E, in alignment with the recess C of the mold, is provided with a circular aperture $h$, corresponding in size to the diameter of the mouth of the bottle, to receive therein a cylindrical body F, having a handwheel G mounted thereon, beneath which it is provided with a screw-threaded shank F', entering a box or bearing H, which is internally tapped or threaded to receive the same, and has a pin $i$ projecting from the side thereof and extending through the slot $f'$ in the link $f$, whereby the said box H is supported by said link and raised or lowered therewith.

The body F is provided with a screw-threaded upper end $F^2$, which when the said body F is raised projects into the mold. Upon the upper surface of the body F is a pin $j$, on which is revolubly mounted a core I, having vertical grooves $c'$ therein to form the ribs $c$, and reduced peripherally above the same at $b'$ to form the ridge $b$, and further reduced immediately above at $a'$ to form the shoulder or seat $a$, and the necessary outlet closed by the valve. Upon the upper surface of the core I is a pin $j'$, which enters the aperture $D^2$ in the bottom of the plunger-shank $D'$.

The operation of molding the auxiliary bottle-neck is as follows: The device being in the position shown in Fig. 1, glass is introduced in molten form into the mold to almost wholly fill the same, entering the recess C, the various grooves, and other irregularities of the core I, and the screw-threaded end $F^2$, whereupon the plunger D is caused to descend and press the same. The handle $f^2$ being held, the wheel G is then reversely rotated to force the shank $F'$ thereof farther into the box H and withdraw the upper screw-threaded portion $F^2$ from engagement with the glass, and the core I being revolubly mounted upon the pin $j$ said core will remain stationary within the mold while the body F revolves until the latter leaves said mold, whereupon said core is withdrawn by dislodging the handle $f^2$ from the shoulder $g'$ and dropping the box H to the base of the device. The operation of gravity will ordinarily be sufficient to accomplish the removal of the core after the glass has cooled; but said core may be secured to the shank in any desired manner whereby its revolution is permitted. The mold is then taken apart and the molded article removed therefrom, and all of that portion thereof which projects beneath the shank $A'$ of the neck A and which is formed in the mold above the reduced recess $C'$ thereof is broken off and the said shank $A'$ secured within the mouth of a bottle $A^2$. This I accomplish by outwardly flaring the mouth $A^3$ thereof, as shown in Fig. 3, and weld the said mouth to the said shank $A'$ by means of a clamping-tool comprising a spring body or handle J, having two parallel arms $J'$, which engage the sides of the auxiliary neck A and are provided with downwardly-extending and inwardly-turned flanges $J^2$, which press the said mouth $A^3$ against the shank $A'$.

Extending longitudinally between the arms $J'$ and secured to the end of the handle J by means of a nut $k$ is a spindle K, having a cross-bar $l$ extending horizontally from each side of the same and loosely through the arms $J'$. Somewhat beneath this cross-bar $l$ the spindle K is reduced in diameter and has revolubly mounted upon the same a cylindrical core L, which fits within the top of the neck A and is provided with a reduced lower portion $L'$, which enters said neck from the top of the ribs $c$ to the shoulders $a$, said core being secured in place by means of a pin $m$ extending through said spindle. When this clamping or welding tool J is placed upon the bottle-neck, with the flanges $J^2$ thereof bearing against the mouth $A^3$ of the bottle, said tool is grasped in one hand and the bottle continuously revolved until said flanges $J^2$ have been caused to engage the entire periphery of the mouth $A^3$ and unite the same to the shank $A'$ of the auxiliary neck A, and while the core L frictionally engages the neck A said core, being revoluble upon the spindle K, will permit said neck to revolve with the bottle.

In Fig. 5 I have illustrated a whole bottle as formed by my improved process and apparatus, which is accomplished by continuing the bulb-shaped or flaring top of the mold to conform to the shape of the remainder of the bottle, which, as shown in Fig. 5, embodies a slight departure in the shape of the neck, but has the seat or shoulder $a$ and screw-threaded mouth $d$ formed therein.

Where the auxiliary neck is formed, the same may also be secured in the mouth $A^3$ of the bottle by extending said mouth sufficiently to wholly inclose the neck A, as shown in Fig. 6, and providing the same with an annular inwardly-turned shoulder $A^4$ to receive the shank $A'$ therein.

The advantages resultant from the use of the invention will be manifest to all who are conversant with the general class of devices to which the same appertains.

Having thus fully described my invention, what I claim as new, and desire to secure by Letters Patent, is—

1. The method of forming a glass bottle of the class described, which consists in forming or molding the bottle with an outwardly flared mouth, then molding an auxiliary piece or neck separately and providing the same with an interior inwardly projecting shoulder or valve seat, an annular ridge above the shoulder, and the vertical ribs, inserting said auxiliary piece or neck in the flared mouth of the bottle and uniting the parts together, substantially as described.

2. A mold for forming a glass bottle or neck therefor, recessed in conformity with the external shape of the article, a cylindrical body projecting through the same, having a screw-threaded upper portion in which the molten glass enters and is correspondingly shaped thereby, a core conforming to the internal shape of the article and revolubly mounted upon said body, a screw-threaded shank depending from said body, a box in which the same is revolubly inserted, a wheel upon said body for turning the same to withdraw the threaded portion from the molded article and release the core, and means for raising and lowering said box to withdraw said core, substantially as shown and described.

3. A mold for forming a glass bottle or neck therefor, comprising a plurality of sections recessed in conformity with the external shape of the article, and mounted upon a table suitably supported, said table having a recess therein, a cylindrical body projecting vertically through the same, having a screw-threaded upper portion in which the molten glass enters and is correspondingly shaped thereby, a pin upon the top of said body, a core revolubly mounted thereon, recessed and shouldered to conform to the internal shape of the article, and having a pin upon the top thereof to receive the plunger thereon, a screw-threaded shank depending from said body beneath the table, a box in which the same is revolubly inserted, a wheel upon said body for turning the same to screw the shank into the box and withdraw the threaded portion from the mold, an arm or rod pivoted beneath the table, a link secured thereto, longitudinally slotted, and provided with a handle for raising and lowering the same, a pin upon the side of the box working in said slot, whereby said box is supported by and with the link, and means for supporting said handle, substantially as shown and described.

In testimony that I claim the foregoing as my invention I have signed my name, in presence of two witnesses, this 29th day of December, 1894.

ROSS B. YERBY.

Witnesses:
PERCY T. GRIFFITH,
C. GERST.